(12) United States Patent
Sguotti et al.

(10) Patent No.: US 12,233,449 B2
(45) Date of Patent: Feb. 25, 2025

(54) FRONT TOOTHING ON AN INNER RING OF A WHEEL HUB AND ASSOCIATED EQUIPMENT

(71) Applicant: AKTIEBOLAGET SKF, Gothenburg (SE)

(72) Inventors: Laura Sguotti, Bricherasio (IT); Stefano Galfre, Pinerolo (IT); Davide Antonio Olivieri, Turin (IT)

(73) Assignee: AKTIEBOLAGET SKF (SE)

( * ) Notice: Subject to any disclaimer, the term of this patent is extended or adjusted under 35 U.S.C. 154(b) by 0 days.

(21) Appl. No.: 18/368,263

(22) Filed: Sep. 14, 2023

(65) Prior Publication Data

US 2024/0001428 A1 Jan. 4, 2024

Related U.S. Application Data

(62) Division of application No. 17/712,257, filed on Apr. 4, 2022, now Pat. No. 11,806,775.

(30) Foreign Application Priority Data

Apr. 12, 2021 (IT) .................. 102021000008984

(51) Int. Cl.
*B21J 9/06* (2006.01)
*B21D 53/10* (2006.01)
*F16C 19/18* (2006.01)

(52) U.S. Cl.
CPC ............ *B21D 53/10* (2013.01); *F16C 19/183* (2013.01); *F16C 2326/02* (2013.01)

(58) Field of Classification Search
CPC .... B21D 53/10; F16C 19/183; F16C 2326/02; B21J 5/008; B21J 5/12; B21J 9/025;
(Continued)

(56) References Cited

U.S. PATENT DOCUMENTS 4,893,960 A * 1/1990 Beier ..................... F16D 1/076
403/380

FOREIGN PATENT DOCUMENTS

EP 2551031 1/2013
EP 2551031 A1 * 1/2013 ........... B21D 53/265
(Continued)

OTHER PUBLICATIONS

English translation of JP-2017018991-A (Year: 2017).*
(Continued)

*Primary Examiner* — Jun S Yoo
(74) *Attorney, Agent, or Firm* — Reed Smith LLP

(57) ABSTRACT

A method and equipment for forming a front toothing having a plurality of radial teeth on an annular collar of an inner ring of a wheel hub, wherein a plurality of first knives are axially and sequentially impressed on the annular collar and have a first predetermined circumferential profile (P1) configured to form radial reliefs which are spaced by imprints and have a rounded circumferential profile corresponding to the profile of the ridges of the radial teeth to be obtained; thereafter, a plurality of second knives are axially and sequentially impressed on the annular collar inside the imprints and have a third predetermined circumferential profile (P3) configured to reproduce in reverse at least part of respective opposite flanks of the radial teeth of the front toothing to be obtained.

8 Claims, 4 Drawing Sheets

(58) Field of Classification Search
CPC ..... B21J 5/08; B21J 13/02; B21J 13/08; B21J 5/02; B21J 9/022; B21J 9/06; B21K 1/30
See application file for complete search history.

(56) References Cited

FOREIGN PATENT DOCUMENTS

| | | | | |
|---|---|---|---|---|
| EP | 2551034 A1 | * | 1/2013 | ............. B21D 37/04 |
| EP | 2551034 | | 10/2015 | |
| EP | 3323525 | | 5/2018 | |
| JP | 2017018991 | | 1/2017 | |
| JP | 2017018991 A | * | 1/2017 | ............. B21D 39/00 |

OTHER PUBLICATIONS

Search Report for corresponding Italian Patent Application No. 10202100008994 dated Jan. 4, 2022.
U.S. Appl. No. 17/712,257.

* cited by examiner

FRONT TOOTHING ON AN INNER RING OF A WHEEL HUB AND ASSOCIATED EQUIPMENT

CROSS-REFERENCE OF RELATED APPLICATIONS

This application is a divisional application which is based on and claims priority to U.S. patent application Ser. No. 17/712,257 filed Apr. 4, 2022 which claims prior to Italian Patent Application No. 102021000008984 filed on Apr. 12, 2021, under 35 U.S.C. § 119, the disclosure of which is incorporated by reference herein.

FIELD

The present disclosure relates generally to a method and equipment for forming a front toothing on a ring for a wheel hub.

BACKGROUND

In wheel hubs, an inner ring may have a front toothing formed by plastic deformation.

BRIEF DESCRIPTION OF THE DRAWINGS

Further characteristic features and advantages of the present disclosure will become clear upon a full reading of this disclosure. Non-limiting exemplary in accordance therewith are described with reference to the figures of the attached drawings, in which.

DETAILED DESCRIPTION

Figure 1:
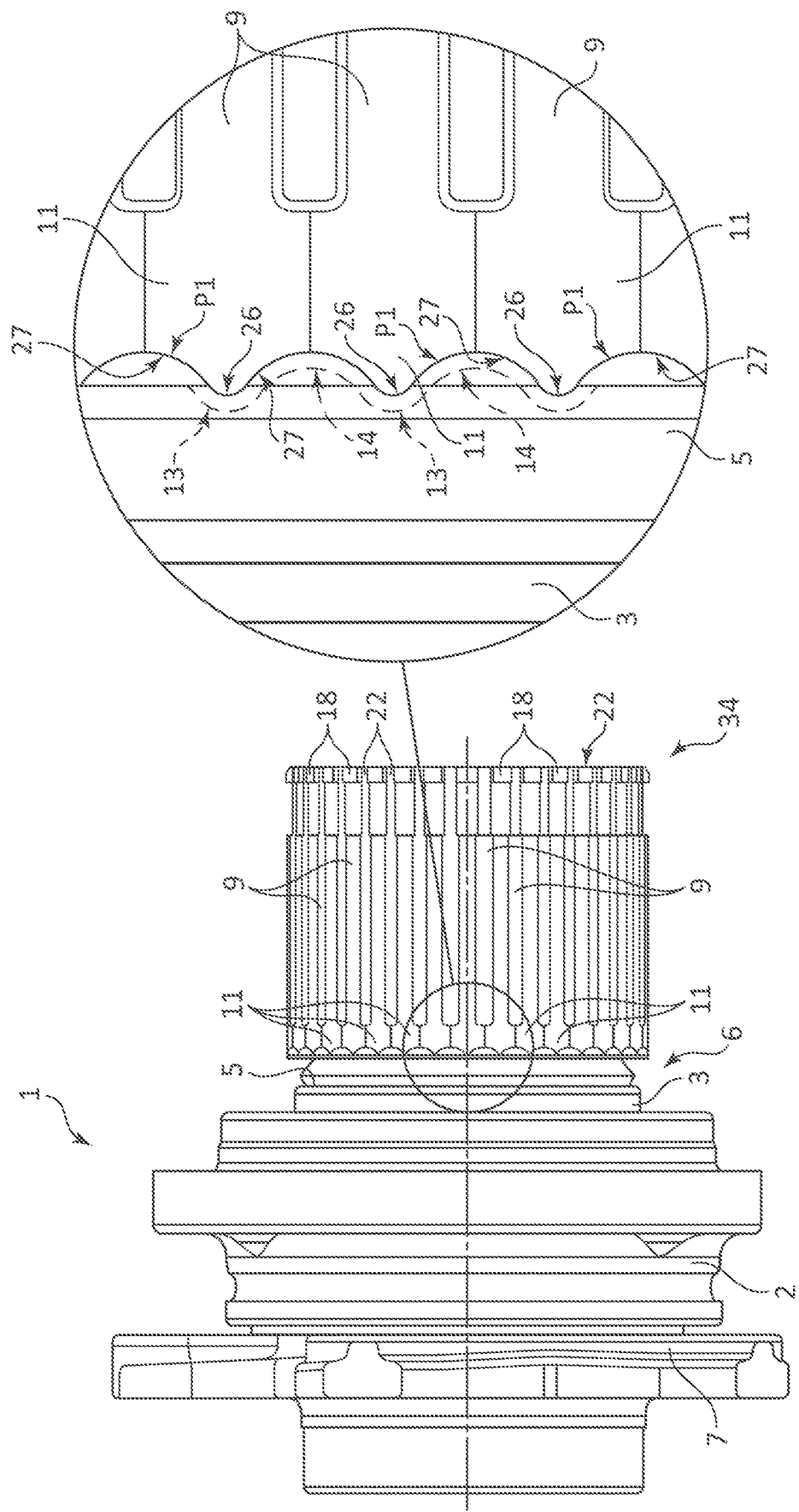
FIG. 1 shows a schematic of an elevation view of a first step of a method according to exemplary embodiments consistent with disclosure carried out using associated equipment.

The present disclosure may be applicable to a wheel hub in which an inner ring forms a spindle provided with a first flanged end and a second end, opposite to the first end, the inner ring having an upset collar configured to receive, by means of impression and consequent plastic deformation, a front toothing necessary for a mechanical connection with, and reception of a driving transmission from a constant-velocity joint forming part of a transmission system of a vehicle.

In wheel hubs consistent with this disclosure, a front toothing may serve to couple head-to-head an inner ring of the wheel hub together with a corresponding front toothing of an outer ring of a constant-velocity joint, in order to ensure transmission of torque from the constant-velocity joint to the inner ring of the wheel hub, which carries a wheel of a vehicle by means of a flanged end. A coupling of this type is described in, e.g., U.S. Pat. No. 4,893,960, which also teaches how to form a front toothing on the inner ring of the wheel hub. In particular, a front toothing is formed using an orbital forming method simultaneously with forming of the upset collar. This is performed by means of a tool including a frustoconical element which performs upsetting of the collar and a frontally toothed tubular element which is mounted slidably axially on the outside of the frustoconical element, which impresses the toothing on the collar still being deformed. An element radially on the outside of the toothed tubular element, which may form part of the same tool or form a second separate tool, controls the deformation of the collar radially towards the outside.

A forming method such as that described in U.S. Pat. No. 4,893,960 requires the use of a relatively complex tool and, in particular, is unable to ensure the formation of teeth with the characteristics of a high uniformity of the profile of the teeth, which is absolutely necessary in view of the increasingly high torques which must be transmitted.

This problem is substantially overcome by EP2551034B1, where a toothing is formed by means of a plurality of sliding knives arranged in a ring on a support, angularly spaced from each other so as to allow mounting directly on an inner ring of an already assembled wheel hub.

With a method according to EP2551034B1, it is possible to obtain a high uniformity in the dimensions of a front toothing using a substantially simple and lower cost tool. However, the correct formation of the teeth is not always achieved, in particular as regards the shape of the tips or ridges of the teeth, which tend to be flat.

This means, on the one hand, that it is not always possible to provide the increasingly higher torques which must be transmitted. On the other hand, during assembly of the wheel hub and constant-velocity joint, incorrect tooth-on-tooth mounting may occur, meaning that the teeth of the two components do not mesh together correctly during coupling. When, during use, the teeth finally snap-engage into the correct position owing to the operating torques, the central screw or nut used to lock the two components together immediately loses the tightening force imparted during assembly. A small amount of front play may also form between the two sets of engaged teeth of the wheel hub and the constant-velocity joint, said play not preventing transmission of the torque, but causing noisiness along the axle, due to the fact that the teeth jump out of the correctly engaged position whenever higher torques are transmitted.

Finally, in a vehicle subject to this condition, the teeth may also gradually become worn. Eventually, a total loss of traction may result in the case of 2WD (two wheel drive) vehicles or only partial loss in the case of AWD vehicles (with four driving wheels which are not always engaged).

In both 2WD and AWD cases, this may over time result in the gradual deterioration of the gears if a driver does not detect the loss of power along an axle, since a control unit of the vehicle will not detect anomalous conditions in good time because the axle without traction still generates a plausible ABS signal.

An object of the present disclosure is to provide a method and associated equipment for forming, by means of plastic deformation, a front toothing on an inner ring of a wheel hub. A method according to this disclosure may ensure a greater dimensional precision of teeth of a front toothing and a high uniformity in terms of both the dimensions and the geometry of a profile of the teeth. In particular, teeth of a front toothing according to this disclosure may be able to avoid flattening of a tip or ridge of the teeth in the front toothing obtained by means of orbital forming.

An object of this disclosure may be to provide a method and associated equipment for forming, by means of plastic deformation, a front toothing on an inner ring of a wheel hub which are able to avoid any possible damage of the inner ring and/or other components of the wheel hub owing to the forces exerted by a forming tool on the inner ring during the forming operation.

Various embodiments of a wheel hub may include an outer ring 2, fastened in a known manner to a suspension upright (not shown) of a vehicle, and an inner ring 3. Outer ring 2 and inner ring 3 may be connected together rotatably by means of two rows of rolling bodies, for example balls, which are known and not shown for simpler illustration, being inserted radially between outer ring 2 and inner ring 3.

An inner ring 3 may be operationally associated during use, in a known manner, with a constant-velocity joint, known and not shown for simpler illustration, by means of a front toothing obtained on an annular collar 5 upset on a first end 6 of inner ring 3. A first end 6 may be provided with a flange 7 for mounting a vehicle wheel on a side opposite end 6.

In various embodiments, an inner ring 3, an outer ring 2, and an annular collar 5 may be coaxial with each other, having a common axis of symmetry A which may coincide with a general axis of symmetry of a wheel hub 1.

In various embodiments, an upset annular collar 5 may be obtained by means of orbital forming. A plastic deformation operation may be carried out on a terminal end 6 so as to impart to upset annular collar 5 a predetermined radial profile by means of a rotating tool (known and not shown for simpler illustration) provided with a precession movement.

In various embodiments, an upset annular collar 5 may be provided with a front toothing 4 formed on a front face of an end 6 and arranged approximately perpendicular to an axis of symmetry A of a wheel hub 1, generally, and of an inner ring 3, in particular.

A front toothing 4 nay include a plurality of radial teeth 8 formed annularly and with a constant pitch on an end 6 of an inner ring 3, and in particular on an upset annular collar 5 which may be preformed on end 6.

Figure 3:
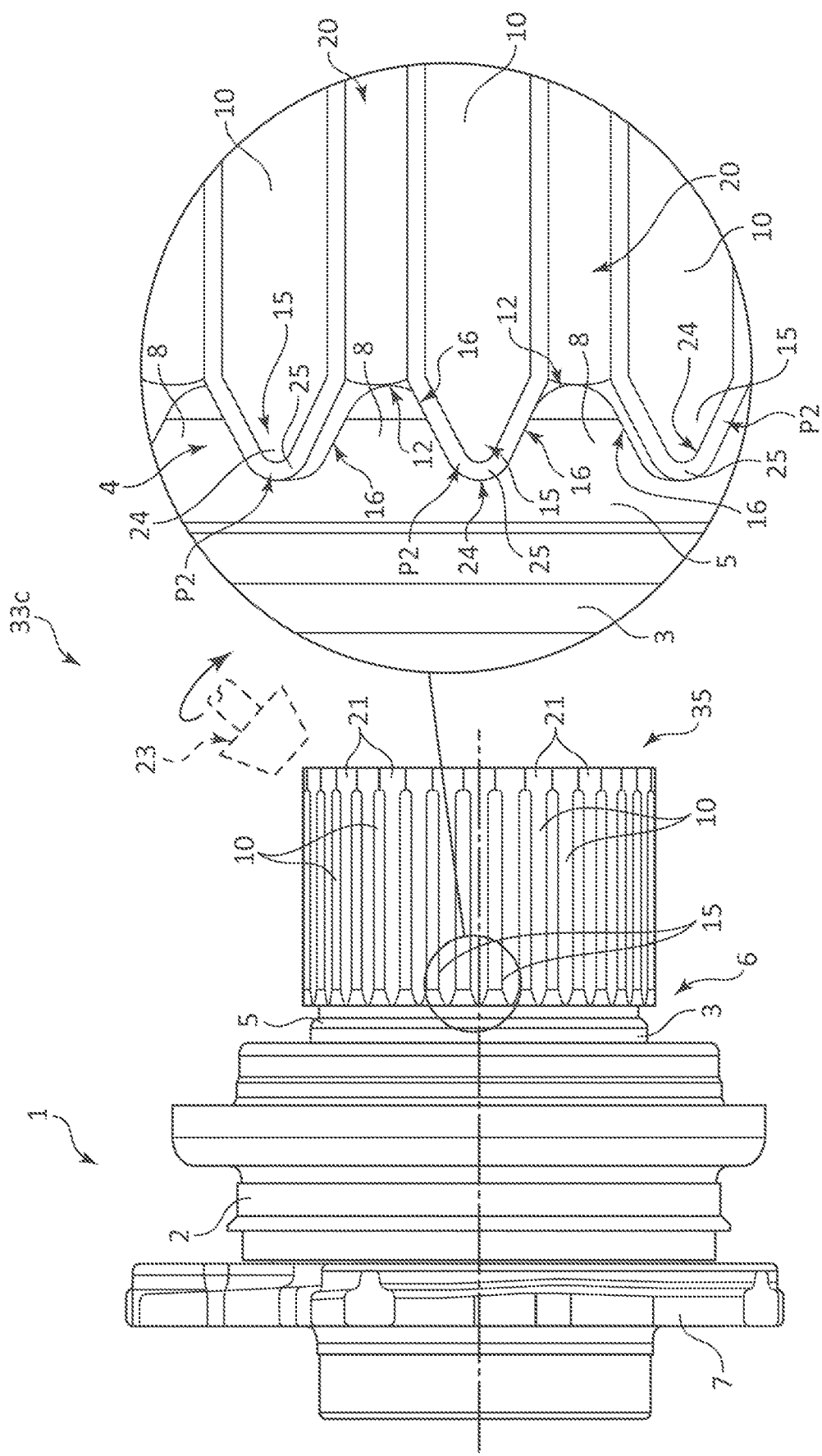
FIG. 3 shows a schematic of a second step of a method according to exemplary embodiments consistent with this disclosure.

Following this preparatory operation or step and using equipment which is similar, in terms of general structure, to that described in EP2551034B1, the contents of which are incorporated herein by reference, a front toothing 4 may be obtained according to this disclosure, by means of a method consisting of steps schematically illustrated in the Figures, e.g., FIGS. 1 and 3.

In particular, a method according to this disclosure may include at least one operation for plastic deformation of an annular collar 5, in which a plurality of knives 10, arranged annularly and symmetrically around an axis of symmetry A of annular collar 5, may be slidably guided axially parallel to axis A and may be axially and sequentially impressed on annular collar 5.

In various embodiments, a step consistent with FIG. 1 may be performed as a preparatory step for a step consistent with FIG. 3 in which a plurality of second knives 30 may be used for forming a front toothing 4.

In order to carry out a first step shown in FIG. 1, according to disclosure equipment similar to that which may be used to perform a step of FIG. 3 may be used. Overall, an equipment for performing the steps of FIGS. 1 and 3 are, in terms of their general structure, similar to that described in EP2551034B1, incorporated by reference, with variations described in this disclosure.

In various embodiments, a method for forming by means of plastic deformation a front toothing 4 by plastic deformation may include a first step, illustrated in FIG. 1, in which a plurality of first knives 9 provided towards an annular collar 5, are axially and slidably impressed on the annular collar 5. A plurality of first knives 9 may be provided with a plurality of first forming ends 11 having a first predetermined circumferential profile P1.

In various embodiments, a first circumferential profile P1 may be configured to reproduce in reverse at least part of a ridge 12 of a plurality of radial teeth 8 of a front toothing 4, so as to form annularly on an annular collar 5 aa plurality of imprints 13 alternating annularly with a plurality of reliefs 14, shown in broken lines. Imprints 13 and reliefs 14 may be arranged annularly about an axis of symmetry X. Reliefs 14 may be spaced from each other circumferentially with a constant pitch by imprints 13.

In various embodiments, a profile P1 may be configured so that a plurality of radial reliefs 14, after being impressed, have a rounded circumferential profile corresponding to a rounded profile of a plurality of ridges 12 of a plurality of radial teeth 8 to be obtained.

With reference to FIG. 3, various embodiments of a method for forming a front toothing 4 by means of plastic deformation may include a second step in which a plurality of second knives 10, provided towards an annular collar 5 with a plurality of second forming ends 15 having a second predetermined circumferential profile P2, are axially and sequentially impressed on annular collar 5.

A second predetermined circumferential profile P2 may be configured to reproduce in reverse, wholly or partly, a profile of respective opposite flanks 16 of a plurality of radial teeth 8 of a front toothing 4 to be obtained.

During a second step, e.g., FIG. 3, a plurality of second knives 10 may be impressed inside a plurality of radial imprints 13 formed on a collar 5 during a first step, e.g., FIG. 1, until each of a plurality of teeth 8 of a front toothing 4 to be obtained are formed on annular collar 5.

In various embodiments, during a first step, e.g., FIG. 1, a plurality of first forming ends 11 of first knives 9 may be guided against an annular collar 5 in circumferential contact with each other, substantially without play, as illustrated in FIG. 1.

For this purpose, first knives 9 may be shaped to be circumferentially thinner than each respective first forming end 11, allowing mounting thereof on equipment similar to that of EP2551034B1. First knives 9 may further include a plurality of pressing heads 18 arranged on a side opposite to a corresponding first forming end 11 and configured to receive singly an axial compressive force suitable for pushing forming ends 11 of first knives 9 against a collar 5 in order to form a plurality of imprints 13 thereon.

Figure 4:
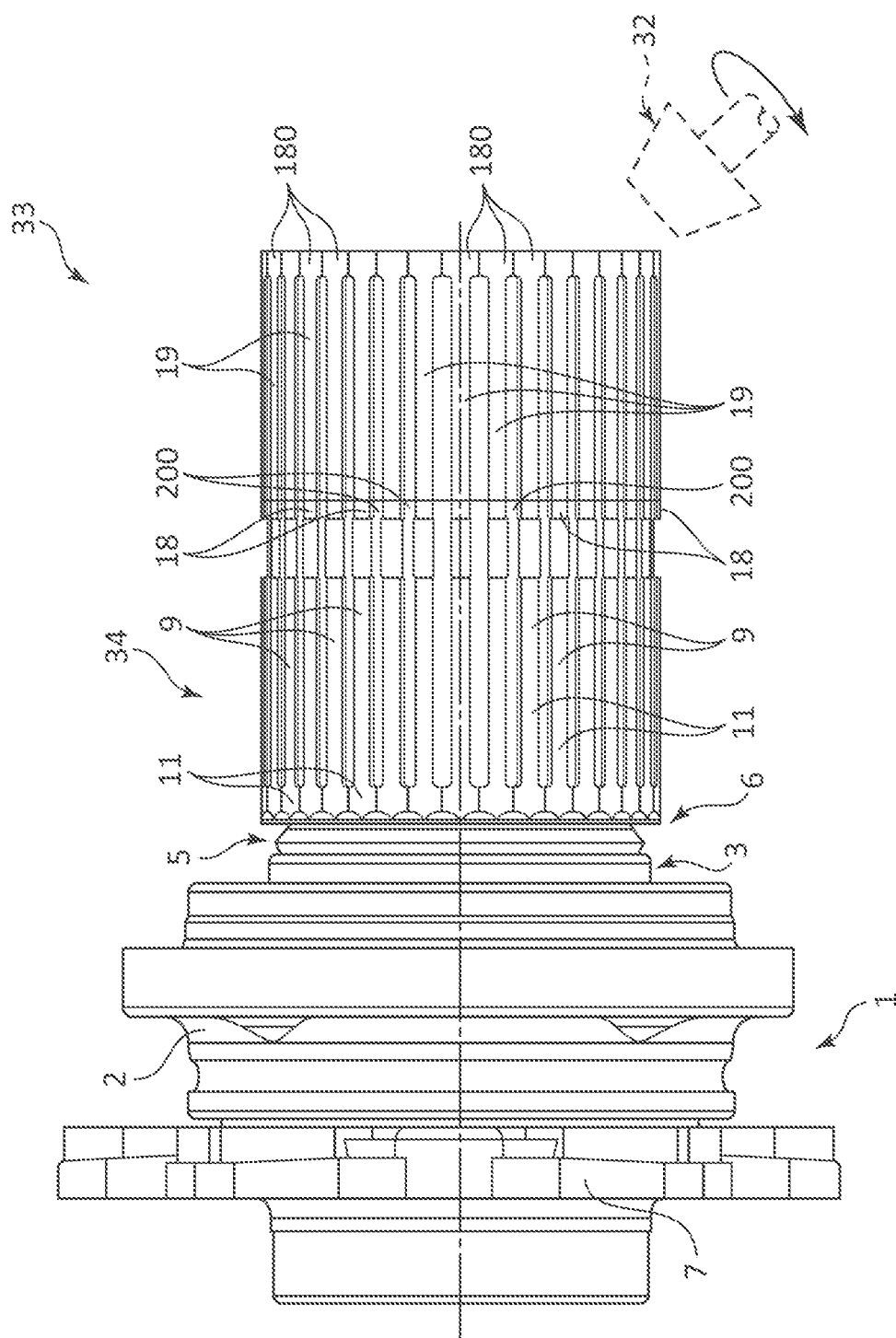
FIG. 4 shows a schematic of a detail of a material execution of a first step and a second step of a method according to exemplary embodiments consistent with this disclosure.

In various embodiments, illustrated in FIG. 4, a plurality of pressing heads 18 maintain a circumferential clearance 200 between each other. In order to obtain optimum guiding of a plurality of first knives 9 while at the same time allowing easy assembly thereof, pressing heads 18 may be mounted head-to-head against a plurality of third knives 19, mounted coaxially with first knives 9.

In various embodiments, a plurality of third knives 19 may have a plurality of pressing heads 180 arranged on a side opposite a plurality of first knives 9 and arranged substantially in contact with each other, namely with a circumferential clearance which is approximately zero, or in any case very small. Pressing heads 180 may be configured to cooperate singly, each with a same orbital forming head 32, which is known and shown only schematically and in broken lines in FIG. 4, being provided with a precession rotating movement.

In various embodiments, a pressing head 32 may push a plurality of first knives 9 selectively and by means of a plurality of interposed third knives 19 against a collar 5 to form a plurality of imprints 13. Consequently, a plurality of reliefs 14 may be formed by means of a metallic material which is displaced from imprints 13 by means of first knives 9.

In various embodiments, during a second step, e.g., FIG. 3, a plurality of second forming ends 15 of a plurality of second knives 10 may be guided against an annular collar 5. Second forming ends 15 may be circumferentially spaced from each other and may have a predetermined circumferential clearance 20 between each adjacent second forming end 15.

In various embodiments, a predetermined circumferential clearance 20 may be substantially identical to a circumferential extension of a plurality of radial reliefs 14 so that a plurality of second knives 10, when impressed against a collar 5, may not directly affect reliefs 14. This may allow reliefs 14 to remain substantially unchanged and be gradually formed, while second knives 10 may form a plurality of flanks 16 of a plurality of teeth 8 and a plurality of ridges 12 of the teeth 8, once flanks 16 are finished.

For this purpose, each second knife 10 may include a pressing head 21 arranged on a side opposite each corresponding second forming end 15 and may be configured to cooperate circumferentially without play in contact with each corresponding pressing head 15 of second knives 10 immediately adjacent thereto.

In various embodiments, a plurality of pressing heads 18 of a plurality of first knives 9 may be arranged to maintain a predetermined circumferential clearance 200 between them, as described above and as schematically shown in FIG. 4.

In various embodiments, a plurality of pressing heads 21 of a plurality of second knives 10 may be configured to cooperate individually and selectively with a pushing element, in this case formed directly by a known orbital forming head 23 which is similar or identical to an orbital forming head 32 used for a plurality of knives 9, provided with a precession rotating movement.

In various embodiments, a second circumferential profile P2 of a plurality of second forming ends 15 of a plurality of second knives 10 may be configured so that each second forming end 15 has a rounded ridge 24 that may reproduce in reverse a circumferential profile of a respective opposite flank 16 of two immediately adjacent radial teeth 8 of a front toothing 4 and of a respective concavity 25 of front toothing 4, presenting between each pair of immediately adjacent radial teeth 8 of front toothing 4.

According to various embodiments of the disclosure, a first circumferential profile P1 of a plurality of first forming ends 11 of a plurality of first knives 9 may be shaped in a manner of gull wings. Each first forming end 11 may include a rounded ridge 26 configured to form one of a plurality of radial imprints 13 on an annular collar 5.

Each first forming end 11 may further include a pair of opposite concave curved flanks 27. Each pair of opposite concave flanks 27 of each pair adjacent forming ends 11 may be configured to reproduce, together, a final substantially rounded profile of a ridge 12 of radial teeth 8 of a front toothing 4.

Figure 2:
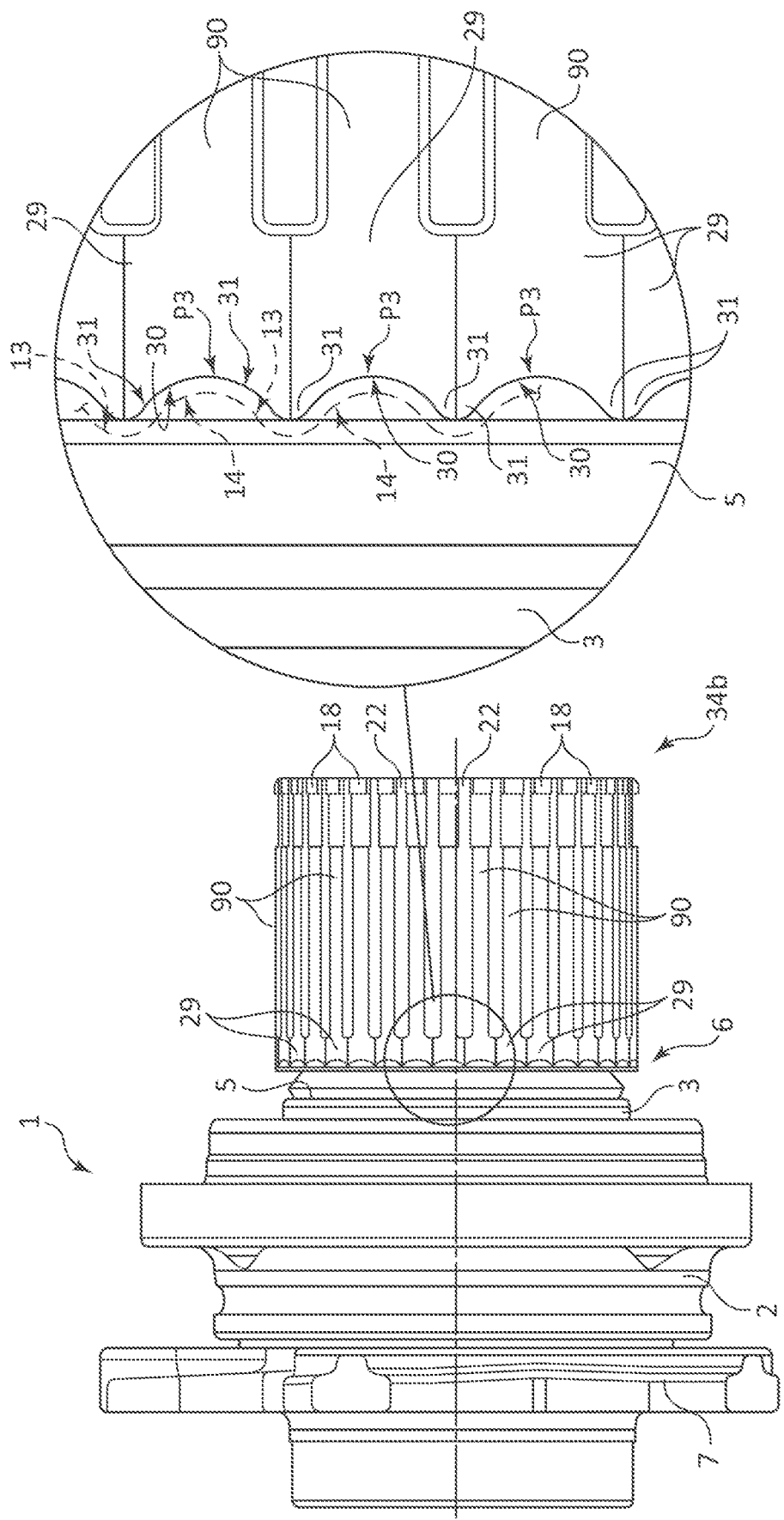
FIG. 2 shows a schematic of an elevation view of a first step of a method according to exemplary embodiments consistent with this disclosure wherein a ridge of a tooth may be formed with a single knife.

With reference to FIG. 2, various embodiments of a method according to this disclosure may include a first step in which a plurality of first knives 90 may be used. First knives may have a plurality of first forming ends 29 having a different shape than a plurality first forming ends 11 of a plurality of knives 9.

In particular, first forming ends 29 of knives 90 have a third circumferential profile P3 defined by a concavity 30 formed inside each knife 90 and by a pair of opposite circumferential flanks 31 of each knife 90, which may be rounded towards concavity 30.

In various embodiments, each flank 31 of a pair opposite flank 31 of each first knife may be arranged circumferentially and in contact with a corresponding opposite flank 31 of an immediately adjacent knife 90.

Opposite flanks 31 of each first knife 90 may be shaped so that each pair of opposite flanks 31 of two immediately adjacent first knives 90 may form a radial imprint 13 of a plurality of radial imprints 13 on an annular collar 5.

In various embodiments, a concavity 30 formed inside a first knife 90 may be configured to reproduce a final rounded profile of a ridge 12 of a plurality of radial teeth 8 of a front toothing 4.

A difference between an embodiment of a first step of method shown in FIG. 1 and an embodiment of a first step shown in FIG. 2 is that a shape of forming ends 11 of first knives 9 and a shape of forming ends 29 of first knives 90 is different. Because of this different, ridges 12 of teeth 8 of toothing 4 may be formed already at a first step, but by realizing each ridge 12 by means of a pair of adjacent knives 9 in the case of embodiments consistent with FIG. 1 or by means of a single knife 90 in the case of embodiments consistent with FIG. 2.

An equipment 33 for forming a front toothing 4 having a plurality of radial teeth 8 located on an inner ring 3 of a wheel hub 1, inner ring 3 provided at a first end 6 with an annular collar 5 having a predetermined radial profile, may include a plurality of knives, e.g. 9,90,10, arranged annularly, symmetrically around an axis of symmetry A of annular collar 5 and guided axially slidably parallel to axis A by means of a machine design similar to that described in EP2551034B1, where knives, e.g., 9,90, are configured to be axially and sequentially impressed on annular collar 5 by means of an orbital forming head 32 with an arrangement of a plurality of third knives 19 in between. Knives 10 may be configured to be impressed axially and sequentially on annular collar 5 by means of an orbital forming head, e.g. 23, 32.

According to various embodiments of this disclosure, an equipment 33 may include a first set, e.g., 34, 34b, of a plurality of first knives, e.g., 9, 90, having first forming ends, e.g., 11, 29, with a first circumferential profile, e.g., P1, P3, corresponding in reverse to a profile of a plurality of respective ridges 12 of a plurality of teeth 8 of a front toothing 4, first knives, e.g., 9, being configured to impress against an annular collar 5 on a side of first forming ends, e.g., 11, 29, so as to form on annular collar 5 a plurality of rounded radial reliefs 14 constituting ridges 12 of radial teeth 8 of front toothing 4 and a plurality of radial imprints 13 circumferentially separating radial reliefs 14 from each other.

An equipment 33 may further include a second set 35 of a plurality of second knives having a plurality of second forming ends 15 with a second circumferential profile P2 corresponding in reverse to at least part of a respective opposite flanks 16 of radial teeth 8 of front toothing 4. Second knives 10 may be configured to impress against annular collar 5 on a side of second forming ends 15 after first knives, e.g. 9, 90, and inside radial imprints 13, in order to form on annular collar 5 front toothing 4.

In various embodiments, a second set 35 of a plurality of second knives 10 may be assembled on a single orbital forming equipment instead of a first set, e.g., 34, 34*b*, of a plurality of first knives, e.g. 9, 90. In other embodiments, a second set 35 of a plurality of second knives may be permanently assembled on a second orbital forming equipment 33*c*.

In fact, equipment 33 and 33*c* have a fundamental feature that, in addition to the presence of two separate sets 34, 34*b* and 35 of forming knives, e.g, 9, 90, first forming ends, e.g., 11, 29 of first knives, e.g., 9, 90 may be arranged in circumferential contact with each other, substantially without play; while second forming ends 15 of second knives 10 may arranged circumferentially spaced from each other, so that a predetermined circumferential clearance 20 is present between each second forming end 15 and second forming ends 15 immediately adjacent thereto.

In various embodiments, a set 34 may include a plurality of first knives first knives, e.g., 9, 90 that may be circumferentially thinner than each of a plurality of respective first forming ends, e.g., 11, 29, so as to determine a presence of a circumferential clearance 200.

Both first knives, e.g., 9, 90 and second knives 10 each include a pressing head 18,21 arranged on the opposite side to the corresponding first or second forming end 11 or 29 and the pressing heads 18,21 of the first knives 9,90 and of the second knives 10 being arranged, respectively with circumferential play and in circumferential contact with each other, and being configured to each cooperate individually, indirectly by means of the knives 19, or directly, with an orbital forming head, 32 and 23, respectively.

Basically a final shape of known toothings is defined during the indentation process, which requires a considerable amount of force, which however must be limited in order to avoid damage to the bearing, since it is applied virtually at a single point (each tooth is formed separately). This compromise between conflicting needs creates the model of the tooth, but the tip of each tooth is almost flat. In order to produce a correctly rounded tip an additional force would be necessary, with the risk of damaging the equipment and/or the wheel hub.

According to present disclosure, a forming process may be divided into two steps. In a first step, only rounding of a plurality of teeth 8 is performed. During this step, an outline of a toothing 4 formed by a plurality of imprints 13 and a plurality of reliefs 14 may be created, where an overall depth of the teeth defined by the reliefs 14 may be fairly small.

In a second step, marked deformation of imprints 13 may be performed, thus creating a remainder of teeth 8, with more attention being focused on formation of a flank 16 of teeth 8 and on the root of teeth 8 defined by a plurality of concavities 25. In this way, a load transmitted by an equipment 33 to a wheel hub 3 may be equally divided between a step one and a step two.

As shown in FIGS. 1 and 2, various embodiments of a first step, which may create a rounded form of a plurality of ridges 12 of a plurality of teeth 8, may be performed using an equipment, e.g., 33, 33*c*, which differ in terms of a design and shape of a plurality of first forming ends, e.g., 11, 29. A dividing line between a pair of adjacent first knives, e.g. 9, 90, may be positioned on the top of the teeth 8 (FIG. 1) or at the bottom, at the maximum depth of the depressions 25 (FIG. 2). A shape of first knives, e.g., 9, 90, may be different depending on the desired result. In various embodiments, it is possible to have a small or large radius both at a ridge 12 of teeth 8 and at a bottom, in a middle of concavities 25.

By using two steps, knives 9, 90 and 10 may be operated with lower axial forces, resulting in savings in terms of energy and reducing risk of damaging tools and/or a wheel hub.

In various embodiments, a method for forming a front toothing comprising a plurality of radial teeth on an inner ring of a wheel hub, wherein the inner ring is provided at a first end thereof with an annular collar having a predetermined radial profile, the method comprising at least one operation for plastic deformation of the annular collar in which a plurality of knives arranged in a ring, symmetrically about an axis of symmetry (A) of the annular collar and guided axially slidably parallel to said axis of symmetry, are axially and sequentially impressed on the annular collar. The method includes a first step, in which a plurality of first knives, equipped towards the annular collar with respective first forming ends having a first predetermined circumferential profile (P1;P3) are axially and sequentially impressed on the annular collar, the first circumferential profile (P1;P3) being configured to reproduce in reverse at least part of a tip or ridge of the radial teeth of the front toothing to be obtained, so as to form in a ring arrangement on the annular collar an alternation of radial imprints and radial reliefs spaced from each other circumferentially by the imprints, wherein the radial reliefs have a rounded circumferential profile corresponding to a profile of the tips or ridges of the radial teeth to be obtained; and a second step, in which a plurality of second knives, equipped towards the annular collar with respective second forming ends having a second predetermined circumferential profile (P2) are axially and sequentially impressed on the annular collar, the second predetermined circumferential profile (P2) being configured to reproduce in reverse at least part of respective opposite flanks of the radial teeth of the front toothing to be obtained; in the second step, the second knives being impressed inside the radial imprints formed in the first phase, until they form on the annular collar the whole front toothing to be obtained.

In various embodiments the first step the first forming ends of the first knives are guided against the annular collar in circumferential contact with each other, substantially without play.

In various embodiments the first knives are shaped so as to be circumferentially thinner than their respective first forming ends and so as to each comprise a pressing head arranged on the opposite side to the corresponding first forming end, and configured to remain circumferentially spaced from each other with a predetermined clearance and to cooperate individually, directly, or indirectly by means of third knives, coaxial in relation to them, with an orbital forming head.

In various embodiments the second step the second forming ends of the second knives are guided against the annular collar circumferentially spaced from each other, such that a predetermined circumferential clearance is present between each second forming end and the second forming ends immediately adjacent thereto.

In various embodiments predetermined circumferential clearance is provided so as to be substantially identical to a circumferential extension of said radial reliefs obtained at the end of the first step; each said second knife comprising a pressing head arranged on the opposite side to the corresponding second forming end and configured to cooperate circumferentially, in contact without play, with corresponding pressing heads of the second knives immediately adjacent thereto; said pressing heads of the second knives being further configured to cooperate individually with an orbital forming head.

In various embodiments the second circumferential profile (P2) of the second forming ends of the second knives is configured such that each second forming end has a rounded tip or ridge and reproduces in reverse a circumferential profile of respective opposite flanks of two immediately adjacent radial teeth of the front toothing to be obtained and of a respective concavity or depression of the front toothing to be obtained present between said two immediately adjacent radial teeth of the front toothing to be obtained.

In various embodiments the first circumferential profile (P1) of the first forming ends of the first knives is shaped in the form of gull wings, each first forming end comprising a rounded tip or ridge configured to form on the annular collar one of said radial imprints, and a pair of opposite curved concave flanks, the opposite concave flanks of two adjacent first forming ends being configured to reproduce together the final rounded profile of a tip or ridge of the radial teeth of the front toothing to be obtained.

In various embodiments, the first circumferential profile (P3) of the first forming ends of the first knives is bounded by a concavity formed within each first knife and by a pair of opposite circumferential flanks of each first knife rounded towards the concavity; said opposite flanks of each first knife being circumferentially arranged in contact with corresponding opposite flanks of the first knives immediately adjacent thereto and being shaped so that each pair of opposite flanks of two first knives adjacent to each other is configured to form on the annular collar one of said radial imprints; the concavity obtained within each first knife being configured to reproduce the final rounded profile of a tip or ridge of the radial teeth of the front toothing to be obtained.

In various embodiments, the inner ring is provided at a first end thereof with an annular collar having a predetermined radial profile, the equipment comprising a plurality of first and second knives arranged in a ring, symmetrically around an axis of symmetry (A) of the annular collar and guided axially slidably parallel to said axis of symmetry, the first and second knives being configured to be axially and sequentially impressed on the annular collar, indirectly or directly, by means of an orbital forming head; wherein a first set of first knives having first forming ends having a first circumferential profile (P1;P3) corresponding in reverse to that of respective tips or ridges the front toothing to be obtained, the first knives being configured to be impressed against the annular collar on the side of their first forming ends so as to form on the annular collar a plurality of rounded radial reliefs constituting all the tips or ridges of the radial teeth of the front toothing to be obtained, and a plurality of radial imprints circumferentially separating the radial reliefs from each other; and a second set of second knives having second forming ends having a second circumferential profile (P2) corresponding in reverse to at least part of that of respective opposite flanks of the radial teeth of the front toothing to be obtained; the second knives being configured to be impressed against the annular collar on the side of their second forming ends after the first knives and inside the said radial imprints, in order to form on the annular collar the entire front toothing to be obtained.

In various embodiments, the first forming ends of the first knives are arranged in circumferential contact with each other, substantially without play; and in that the second forming ends of the second knives are arranged circumferentially spaced from each other, so that there is a predetermined circumferential clearance between each second forming end and the second forming ends immediately adjacent thereto; the first knives being circumferentially thinner than their respective first forming ends; the first and second knives each comprising a pressing head arranged on the opposite side to the corresponding first or second forming ends; the pressing heads of the first knives and of the second knives being arranged, respectively, with circumferential clearance and in circumferential contact with each other and being configured to each cooperate individually, indirectly by means of third knives, coaxial in relation to them, or directly, with said orbital forming head.

We claim:

1. An equipment for forming a front toothing having a plurality of radial teeth on an inner ring of a wheel hub, wherein the inner ring is provided at a first end with an annular collar having a predetermined radial profile, the equipment comprising:
   a first set of a plurality of first knives having a plurality of first forming ends with a first circumferential profile corresponding in reverse to a profile of a plurality of ridges of the front toothing, the first knives configured to be impressed against the annular collar on the same side as the plurality of first forming ends to form on the annular collar a plurality of rounded radial reliefs and a plurality of radial imprints alternating circumferentially and separating each of the plurality of radial reliefs; and
   a second set of a plurality of second knives having a plurality of second forming ends with a second circumferential profile corresponding in reverse to a plurality of respective opposite flanks of the radial teeth of the front toothing, the second knives configured to be impressed against the annular collar on the same side as the plurality of second forming ends after the first knives and inside the radial imprints,
   wherein the first knives are arranged annularly and symmetrically about an axis of symmetry of the annular collar and are guided axially, slidably, parallel to the axis of symmetry of the annular collar, wherein the first knives are configured to be axially and sequentially impressed on the annular collar by means of a first orbital forming head; and
   wherein the second knives are arranged annularly and symmetrically about the axis of symmetry of the annular collar and are guided axially, slidably, and parallel to the axis of symmetry of the annular collar, wherein the second knives are configured to be axially and sequentially impressed on the annular collar by means of a second orbital forming head.

2. The equipment according to claim 1, wherein the first forming ends of the first knives are arranged in circumferential contact with each other, substantially without play.

3. The equipment of claim 2, wherein the second forming ends of the second knives are arranged circumferentially spaced from each other, creating a predetermined circumferential clearance between adjacent second knives.

4. The equipment of claim 3, wherein the first knives are circumferentially thinner than the first forming ends.

5. The equipment of claim 4, wherein the plurality of first knives further comprise a plurality of pressing heads arranged on a side axially opposite the plurality of first forming ends, wherein the plurality of pressing heads of the first knives are arranged with a circumferential clearance between adjacent pressing heads of the first knives and are configured to cooperate with the first orbital forming head.

6. The equipment of claim 4, wherein the plurality of first knives further comprise a plurality of pressing heads arranged on a side axially opposite the plurality of first forming ends, wherein the plurality of pressing heads of the first knives are arranged in circumferential contact with each adjacent pressing head of the first knives and are configured to cooperate with the first orbital forming head.

7. The equipment of claim 5, wherein the plurality of second knives further comprises a plurality of pressing heads arranged on a side axially opposite the plurality of second forming ends wherein the plurality of pressing heads of the second knives are arranged with a circumferential clearance between adjacent pressing heads of the second knives and are configured to cooperate with the orbital forming head.

8. The equipment of claim 6, wherein the plurality of second knives further comprises a plurality of pressing heads arranged on a side axially opposite the plurality of second forming ends wherein the plurality of pressing heads of the second knives are arranged in circumferential contact with adjacent pressing heads of the second knives and are configured to cooperate with the orbital forming head.

* * * * *